US009646443B2

(12) United States Patent
Hamada et al.

(10) Patent No.: US 9,646,443 B2
(45) Date of Patent: May 9, 2017

(54) VEHICLE WIRELESS COMMUNICATION SYSTEM, VEHICLE CONTROL DEVICE, AND PORTABLE MACHINE

(71) Applicants: Kazuya Hamada, Aichi (JP); Takahiro Inaguma, Aichi (JP); Yosuke Tomita, Aichi (JP)

(72) Inventors: Kazuya Hamada, Aichi (JP); Takahiro Inaguma, Aichi (JP); Yosuke Tomita, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 15/047,461

(22) Filed: Feb. 18, 2016

(65) Prior Publication Data

US 2016/0267734 A1 Sep. 15, 2016

(30) Foreign Application Priority Data

Mar. 13, 2015 (JP) ................................ 2015-050421

(51) Int. Cl.
*B60R 25/24* (2013.01)
*G07C 9/00* (2006.01)

(52) U.S. Cl.
CPC .................... *G07C 9/00309* (2013.01); *G07C 2009/00793* (2013.01); *G07C 2209/63* (2013.01)

(58) Field of Classification Search
CPC .............................. B60R 25/24; B60R 25/245
USPC .......................... 340/426.13, 426.16, 426.36
See application file for complete search history.

(56) References Cited

U.S. PATENT DOCUMENTS

2005/0024181 A1* 2/2005 Hofbeck ................ B60R 25/02 340/5.7
2014/0045531 A1 2/2014 Kessoku et al.
2016/0202697 A1* 7/2016 Matsumoto .......... B60R 25/245 701/2
2017/0008488 A1* 1/2017 Matsumoto ............ B60R 25/24

FOREIGN PATENT DOCUMENTS

JP 2006-342545 A 12/2006
JP 2014-034787 A 2/2014
JP 5619223 B1 11/2014

* cited by examiner

*Primary Examiner* — Kevin Kim
(74) *Attorney, Agent, or Firm* — Osha Liang LLP

(57) ABSTRACT

A portable machine has a signal receivable area in which, when the portable machine approaches one of a plurality of LF transmitters provided to a vehicle at a first distance, a response request signal only from the LF transmitter is receivable by the portable machine and when the portable machine approaches one of the plurality of LF transmitters at a second distance shorter than the first distance, response request signals from the LF transmitter and any of the remaining LF transmitters are receivable by the portable machine. If the portable machine receives the response request signal from only one of the LF transmitters within a predetermined time period and the response request signal has an RSSI value not less than a threshold, control (door locking/unlocking, engine start, and the like) to the vehicle is inhibited.

10 Claims, 11 Drawing Sheets

| LF transmitter | Reception strength comparison threshold |
|---|---|
| Vehicle interior front LF transmitter | Threshold Q1 |
| Vehicle interior rear LF transmitter | Threshold Q2 |
| Vehicle exterior right LF transmitter | Threshold Q3 |
| Vehicle exterior left LF transmitter | Threshold Q4 |
| Vehicle exterior rear LF transmitter | Threshold Q5 |

VEHICLE WIRELESS COMMUNICATION SYSTEM, VEHICLE CONTROL DEVICE, AND PORTABLE MACHINE

CROSS-REFERENCE TO RELATED APPLICATION

This application is based on Japanese Patent Application No. 2015-050421 filed with the Japan Patent Office on Mar. 13, 2015, the entire contents of which are incorporated herein by reference.

FIELD

The disclosure relates to a vehicle wireless communication system configured to control a vehicle in accordance with a wireless signal to be transmitted and received between a vehicle control device mounted on the vehicle and a portable machine carried by a user. The disclosure particularly relates to a vehicle security technique.

BACKGROUND

There has been provided a vehicle wireless communication system configured to perform vehicle control, such as door locking/unlocking and engine start, in accordance with a wireless signal to be transmitted and received between a vehicle control device mounted on the vehicle and a portable machine carried by a user. Communication methods between a vehicle control device and a portable machine are roughly divided into three types, namely, a polling method, a passive entry method, and a keyless entry method. According to the polling method, the vehicle control device transmits response request signals at predetermined cycles regardless of the position of the portable machine. According to the passive entry method, the vehicle control device transmits a response request signal to the portable machine when a user approaches or touches a door knob. According to the keyless entry method, the portable machine transmits a signal to the vehicle control device when a user operates the portable machine.

According to the passive entry method, when a user carrying the portable machine approaches or touches a door knob, the vehicle control device transmits a response request signal to the portable machine from a plurality of antennas provided at the vehicle, and the portable machine receives the response request signal and replies a response signal including an ID code. The vehicle control device collates ID codes upon receipt of this response signal. If matching is successful, the vehicle control device permits door locking/unlocking or engine start. According to the polling method, when a user carrying the portable machine approaches the vehicle, the portable machine receives a response request signal from the vehicle control device and operation similar to the above case is performed subsequently.

There is committed, however, improper communication of cheating as if the portable machine at a far position were located adjacent to the vehicle using a repeater configured to relay a response request signal from the vehicle control device and a response signal from the portable machine. Such improper communication using a repeater is called relay attack. A malicious third party different from an owner of a vehicle may commit a crime such as a theft by unlocking a vehicle door or starting an engine by means of such relay attack.

There have been devised various security measures against relay attack. For example, JP 2006-342545 A discloses providing a vehicle with a plurality of transmission antennas at different positions as well as providing a portable machine with a plurality of reception antennas having different axis directions. The portable machine detects reception strength of each signal from the plurality of transmission antennas at the plurality of reception antennas, and determines whether or not the communication is relay attack by comparing reception strength ratios among the transmitted signals. Specifically, the communication is determined as relay attack if the reception strength ratios are equal among the plurality of signals. The portable machine does not transmit any response signal in this case so as not to unlock a door.

There have also been devised various techniques of accurately determining the position of a portable machine with respect to a vehicle in order to improve vehicle convenience and prevent malfunction. For example, JP 2014-34787 A discloses detecting electric current flowing to each of a plurality of transmission antennas when an onboard machine supplies the transmission antennas with electric power to transmit a request signal and changing thresholds corresponding to the transmission antennas in accordance with the current values. A portable machine detects reception strength of the request signal and replies the reception strength to the onboard machine. The onboard machine compares the reception strength of the request signal detected by the portable machine and the threshold corresponding to the originator of the request signal so as to determine the position of the portable machine.

Furthermore, JP 5619223 B1 discloses determining whether or not a portable machine is located outside a vehicle or inside the vehicle adjacent to the exterior of the vehicle in accordance with detection areas of a plurality of exterior transmission antennas. A threshold referred to for defining a detection area of an interior transmission antenna is changed depending on whether or not the portable machine is located outside the vehicle or inside the vehicle adjacent to the exterior of the vehicle. The threshold is referred to for comparison with received signal strength (an RSSI value) at the portable machine. The portable machine is determined as being located within the detection areas of the transmission antennas if the received signal strength exceeds the threshold.

The onboard machine and the portable machine have more loads if the processing performed by the onboard machine and the portable machine for security against relay attack is more complicated.

Meanwhile, recent investigation has revealed that a repeater has reception sensitivity much lower than that of a portable machine. When a plurality of onboard transmission antennas transmits a signal as exemplified in JP 2006-342545 A, a repeater may relay a signal transmitted from only one of the transmission antennas. In this case, it is impossible to determine whether or not the communication is relay attack.

SUMMARY

One or more embodiments of the disclosure improve security against relay attack without complication of processing performed by a vehicle control device and a portable machine.

A vehicle wireless communication system according to one or more embodiments of the disclosure is configured to cause a vehicle control device mounted on a vehicle to control the vehicle in accordance with a wireless signal transmitted and received between the vehicle control device and a portable machine carried by a user. The vehicle control device includes: a first transmitter configured to transmit a response request signal to the portable machine; and a first receiver configured to receive a response signal from the portable machine. The portable machine includes: a second receiver configured to receive the response request signal from the vehicle control device; a reception strength detector configured to detect reception strength of the response request signal received by the second receiver; and a second transmitter configured to transmit the response signal to the vehicle control device in reply to the response request signal received by the second receiver. The first transmitter includes a plurality of first transmitters to allow the response request signals to reach an area around the vehicle and an interior of a vehicle chamber. The second receiver has a predetermined reception region in which the response request signals are receivable. In the reception region, when the portable machine approaches one of the first transmitters at a predetermined first distance, the response request signal only from the first transmitter is receivable by the portable machine, and when the portable machine approaches one of the first transmitters at a predetermined second distance shorter than the first distance, the response request signals from the first transmitter and any of the remaining first transmitters are receivable by the portable machine. Control to the vehicle is inhibited if the second receiver receives the response request signal from only one of the first transmitters within a predetermined time period and the reception strength of the response request signal is not less than a preliminarily set threshold. Control to the vehicle is permitted if the second receiver receives the response request signals from at least two of the first transmitters within the predetermined time period or if the second receiver receives the response request signal from only one of the first transmitters within the predetermined time period and the reception strength of the response request signal is less than the threshold.

The first distance is set such that, when the repeater used for relay attack approaches a position away at the first distance from one of the plurality of first transmitters, the repeater can receive none of the response request signals from the plurality of first transmitters. The second distance is set such that, when the repeater approaches a position away at the second distance from one of the plurality of first transmitters, the repeater can receive the response request signal only from this first transmitter.

In the above case, when the portable machine is located far away and the repeater having reception sensitivity much lower than that of the portable machine approaches the vehicle, the portable machine receives, within the predetermined time period via the repeater, the response request signal transmitted from one of the plurality of first transmitters provided to the vehicle. The response request signal has high reception strength not less than the threshold. Vehicle control is inhibited in this case. In contrast, when the portable machine approaches the vehicle and receives, within the predetermined time period, the response request signals transmitted from at least two of the plurality of first transmitters, vehicle control is permitted. When the portable machine approaches the vehicle and receives, within the predetermined time period, the response request signal transmitted from only one of the plurality of first transmitters, the response request signal has reception strength lower than the threshold. Vehicle control is permitted in this case. In summary, vehicle control is permitted or inhibited in accordance with determination whether the number of originators of the response request signals received by the portable machine within the predetermined time period is one or at least two, as well as determination whether or not the response request signal received from one of the originators has reception strength not less than the threshold. It is thus possible to improve security against relay attack using the repeater without complication of the processing performed by the vehicle control device and the portable machine. Complication of the processing performed by the vehicle control device and the portable machine can be further restrained when the threshold to be compared with the reception strength of the response request signal has a fixed value. Furthermore, the portable machine is communicable with the vehicle control device and vehicle control is permitted even at a distance from the vehicle incommunicable with the repeater. Security can thus be improved without deterioration in user convenience.

In one or more embodiments of the disclosure, optionally, the threshold is set for each of the first transmitters, and the reception strength of the response request signal transmitted from any of the first transmitters and received by the second receiver within the predetermined time period is compared with the threshold corresponding to the first transmitter.

In one or more embodiments of the disclosure, the portable machine optionally causes the second transmitter to transmit the response signal including reception information in which the reception strength of the response request signal received within the predetermined time period is associated with identification information on the first transmitter that is an originator of the response request signal. Optionally, the vehicle control device further includes a first storage configured to store the thresholds, determines, after the first receiver receives the response signal, whether or not the portable machine receives the response request signals from at least two of the first transmitters within the predetermined time period in accordance with the reception information included in the response signal, or compares, when the portable machine receives the response request signal from only one of the first transmitters within the predetermined time period, the reception strength of the response request signal with the threshold, and permits or inhibits control to the vehicle in accordance with at least one of results the determination result and the comparison result.

In one or more embodiments of the disclosure, the portable machine, instead of the vehicle control device, can determine whether or not the portable machine receives the response request signals from at least two of the first transmitters within the predetermined time period, and can compare the reception strength of the response request signal and the threshold when the portable machine receives the response request signal from only one of the first transmitters within the predetermined time period. In this case, the portable machine further includes a second storage configured to store the thresholds, causes the second transmitter to transmit the response signal including reception information in which the reception strength of the response request signal received within the predetermined time period is associated with identification information on the first transmitter that is an originator of the response request signal if the portable machine receives the response request signals from at least two of the first transmitters within the predetermined time period or if the portable machine receives the response request signal from only one of the first transmitters within the predetermined time period and the reception strength of the response request signal is less than the threshold. The portable machine causes the second transmitter to transmit, instead of the response signal, an inhibiting signal indicative of inhibition of control to the vehicle if the portable machine receives the response request signal from only one of the first transmitters within the predetermined time period and the reception strength of the response request signal is not less than the threshold. The vehicle control device permits, if the first receiver receives the response signal, control to the vehicle in accordance with the response signal, and inhibits control to the vehicle if the first receiver receives the inhibiting signal.

The one or more embodiments of the disclosure achieve improvement in security against relay attack without complication of processing performed by the vehicle control device and the portable machine.

DETAILED DESCRIPTION

Figure 1:
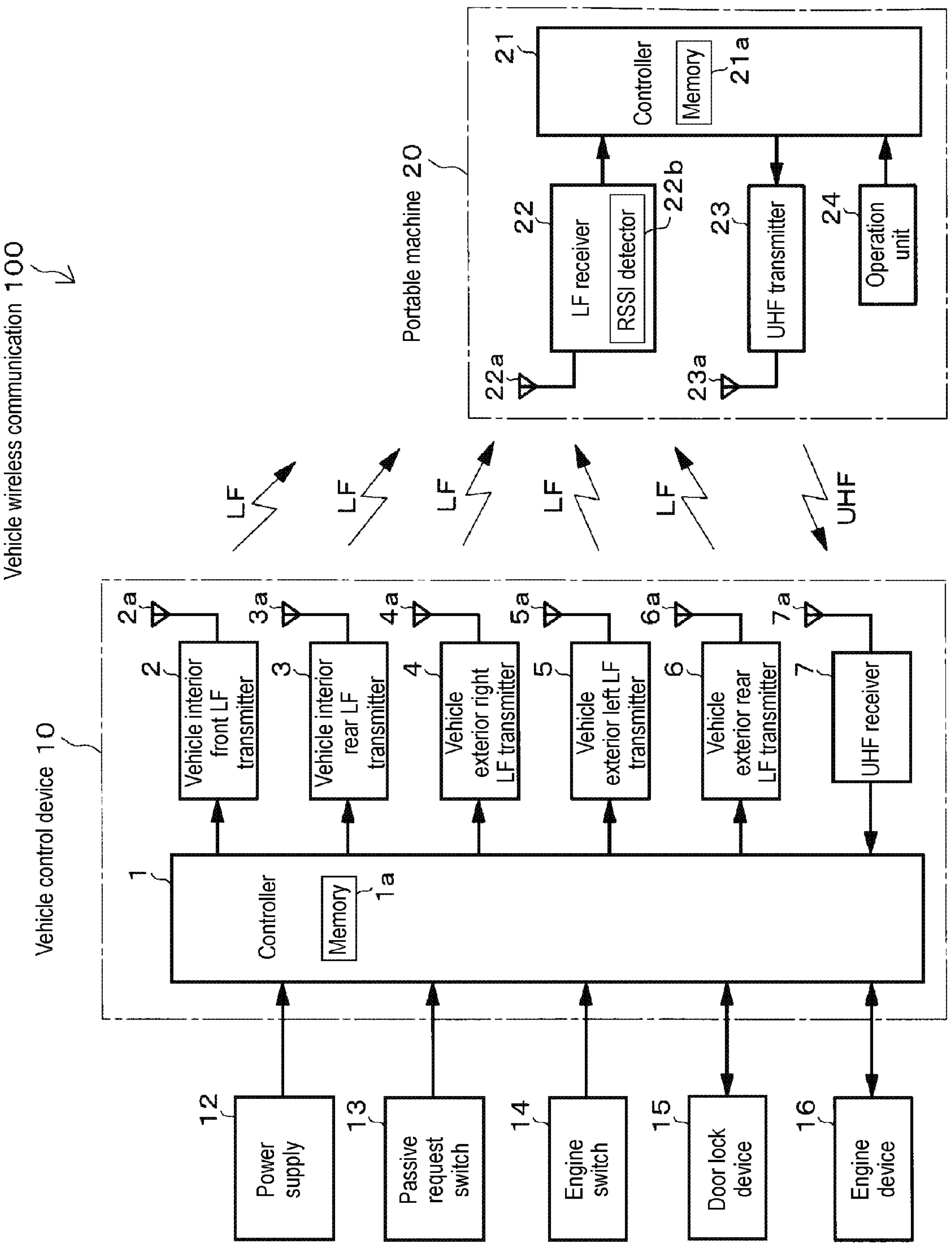
FIG. 1 is a configuration diagram of a vehicle wireless communication system according to one or more embodiments of the disclosure.

Embodiments of the disclosure will be described below with reference to the drawings. In the drawings, the identical or equivalent component is designated by the identical numeral. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention.

Figures 2, 3:
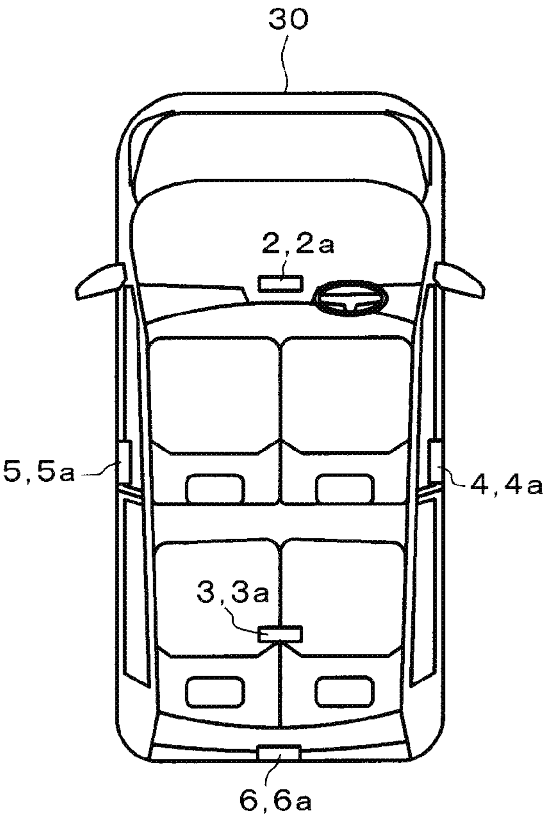
FIG. 2 is a plan view of a vehicle equipped with the vehicle wireless communication system depicted in FIG. 1.
FIG. 3 is a chart indicating thresholds to be compared with reception strength of a response request signal.

A vehicle wireless communication system 100 according to one or more embodiments will initially be described in terms of its configuration with reference to FIGS. 1 to 3.

FIG. 1 is a configuration diagram of the vehicle wireless communication system 100. FIG. 2 is a view of a vehicle 30 equipped with the vehicle wireless communication system 100.

As depicted in FIG. 1, the vehicle wireless communication system 100 includes a vehicle control device 10 and a portable machine 20. In the vehicle wireless communication system 100, the vehicle control device 10 controls the vehicle 30 (FIG. 2) in accordance with a wireless signal transmitted and received between the vehicle control device 10 and the portable machine 20. In one or more embodiments of the disclosure, control to the vehicle 30 includes locking and unlocking doors of the vehicle 30 serving as an automatic four-wheeled vehicle, and starting an engine thereof. The vehicle 30 is provided with five doors that can be locked and unlocked.

The vehicle wireless communication system 100 includes a keyless entry system of locking and unlocking the doors with switch operation to the portable machine 20 when the portable machine 20 is located adjacent to the vehicle 30, or a passive entry system of locking and unlocking the doors and the like by means of automatic communication with the portable machine 20 when a user approaches or touches a door knob.

FIG. 1 depicts the vehicle control device 10, a power supply 12, a passive request switch 13, an engine switch 14, a door lock device 15, and an engine device 16, which are mounted on the vehicle 30. The portable machine 20 is carried by a user of the vehicle 30.

The vehicle control device 10 includes a controller 1, LF (Low Frequency; long wave) transmitters 2 to 6, and a UHF (Ultra High Frequency; microwave) receiver 7. The controller 1 is configured by a microcomputer including a memory 1*a*.

The LF transmitters 2 to 6 each include an LF signal transmission circuit and a corresponding one of transmission antennas 2*a* to 6*a*. As depicted in FIG. 2, the transmission antennas 2*a* to 6*a* of the plurality of (five) LF transmitters 2 to 6 are provided to be dispersed outside and inside a chamber of the vehicle 30.

Specifically, the transmission antenna 2*a* of the vehicle interior front LF transmitter 2 is disposed at a front portion in the chamber of the vehicle 30. The transmission antenna 3*a* of the vehicle interior rear LF transmitter 3 is disposed at a rear portion in the chamber of the vehicle 30. The transmission antenna 4*a* of the vehicle exterior right LF transmitter 4 is disposed adjacent to the exterior of the door at a driver's sheet at the right end of the vehicle 30. The transmission antenna 5*a* of the vehicle exterior left LF transmitter 5 is disposed adjacent to the exterior of the door at a passenger sheet at the left end of the vehicle 30. The transmission antenna 6*a* of the vehicle exterior rear LF transmitter 6 is disposed adjacent to the exterior of the rear door of the vehicle 30.

The LF transmitters 2 to 6 each transmit an LF signal in conformity to the polling method to the interior of the vehicle chamber and the exterior of the vehicle chamber around the vehicle 30 in order to communicate with the portable machine 20. The LF signals transmitted from the LF transmitters 2 to 6 include a response request signal for request of a response from the portable machine 20. By providing the vehicle 30 with the plurality of LF transmitters 2 to 6 as describe above, the response request signals reach an area adjacent to the periphery of the vehicle 30 (outside the vehicle chamber) as well as the area inside the vehicle chamber. The LF transmitters 2 to 6 have signal transmission ranges that are overlapped partially. The LF transmitters 2 to 6 exemplify a "first transmitter" according to one or more embodiments of the disclosure.

The UHF receiver 7 includes a UHF signal reception circuit and a reception antenna 7*a*, and receives a UHF signal transmitted from the portable machine 20. There is provided the only one UHF receiver 7 whereas there is provided the plurality of LF transmitters 2 to 6. The UHF receiver 7 exemplifies a "first receiver" according to one or more embodiments of the disclosure.

The controller 1 controls the LF transmitters 2 to 6 and the UHF receiver 7 to transmit and receive signals and information to and from the portable machine 20. The controller 1 exemplifies a "first controller" according to one or more embodiments of the disclosure.

The portable machine 20 is a FOB key and includes a controller 21, an LF receiver 22, a UHF transmitter 23, and an operation unit 24. The controller 21 is configured by a microcomputer including a memory 21*a.*

The LF receiver 22 includes an LF signal reception circuit, a reception antenna 22*a*, and an RSSI detector 22*b*. The LF receiver 22 receives LF signals transmitted from the LF transmitters 2 to 6 in the vehicle control device 10. The LF signals received by the LF receiver 22 include the response request signal described above. The LF receiver 22 exemplifies a "second receiver" according to one or more embodiments of the disclosure.

The RSSI detector 22*b* detects an RSSI value (received signal strength) of the response request signal received by the reception antenna 22*a*. The RSSI detector 22*b* exemplifies a "reception strength detector" according to one or more embodiments of the disclosure.

The RSSI value of the response request signal detected by the RSSI detector 22*b* is compared with a preliminarily set threshold by the vehicle control device 10 or the portable machine 20 as to be described later.

FIG. 3 is a chart indicating thresholds to be compared with the RSSI value of the response request signal. There is set a plurality of thresholds Q1 to Q5 so as to correspond to the LF transmitters 2 to 6 that are originators of response request signals. The thresholds Q1 to Q5 have fixed values and are stored in the memory 1*a* of the controller 1 in the vehicle control device 10 or the memory 21*a* of the controller 21 in the portable machine 20.

The UHF transmitter 23 in the portable machine 20 depicted in FIG. 1 includes a UHF signal transmission circuit and a transmission antenna 23*a*, and transmits UHF signals to the vehicle control device 10. The UHF signals transmitted from the UHF transmitter 23 include a response signal to be replied to the vehicle control device 10 when the LF receiver 22 receives a response request signal. The UHF transmitter 23 exemplifies a "second transmitter" according to one or more embodiments of the disclosure.

The operation unit 24 includes a switch to be operated for locking and unlocking the doors, and the like. The controller 21 controls the LF receiver 22 and the UHF transmitter 23 to transmit and receive signals and information to and from the vehicle control device 10. The controller 21 exemplifies a "second controller" according to one or more embodiments of the disclosure.

Connected to the vehicle control device 10 are onboard devices such as the power supply 12, the door lock device 15, and the engine device 16, as well as switches such as the passive request switch 13 and the engine switch 14.

The power supply 12 includes a battery configured to supply an electric component of the vehicle 30 with electric power. The passive request switch 13 is disposed adjacent to a door knob on the outer side surface of each of the doors of the vehicle 30. The engine switch 14 is disposed adjacent to the driver's sheet in the chamber of the vehicle 30.

The door lock device 15 includes a mechanism configured to lock and unlock each of the doors of the vehicle 30 and a driving circuit for the mechanism. The engine device 16 includes a starter motor configured to drive the engine of the vehicle 30 and a driving circuit for the starter motor.

A repeater 50 (FIGS. 4A and 4B) used for relay attack has a function of relaying transmission and reception of signals between the vehicle control device 10 and the portable machine 20 even when the portable machine 20 is located far away from the vehicle 30. Improper communication is thus made by cheating as if the portable machine 20 at a far position were located adjacent to the vehicle 30.

Figure 4A:
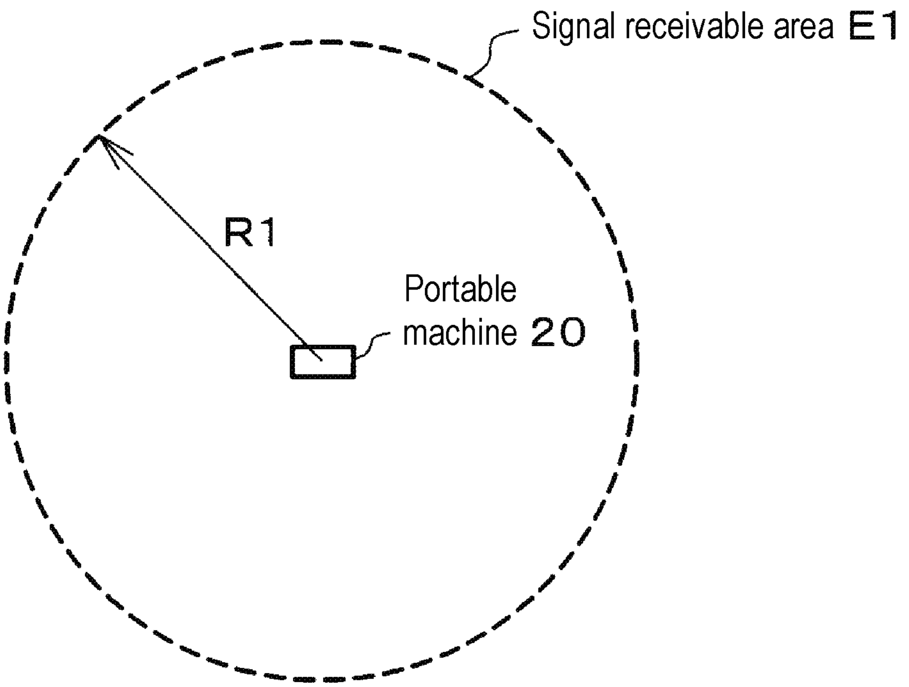
FIGS. 4A and 4B are views indicating signal receivable areas of a portable machine and a repeater.
Figure 4B:
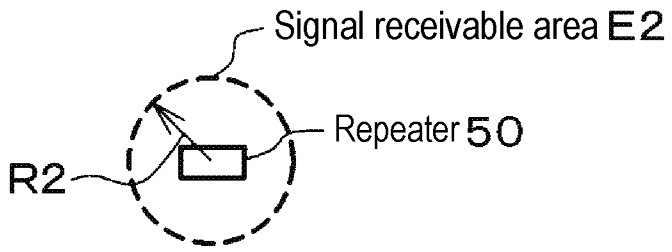

FIGS. 4A and 4B are views indicating signal receivable areas E1 and E2 of the portable machine 20 and the repeater 50. FIG. 4A indicates a dotted circle having a radius R1 corresponding to the signal receivable area E1 in which the LF receiver 22 in the portable machine 20 can receive signals from the LF transmitters 2 to 6 in the vehicle control device 10. FIG. 4B indicates a dotted circle having a radius R2 corresponding to the signal receivable area E2 in which the repeater 50 can receive signals from the vehicle control device 10 or the portable machine 20. The radius R2 is smaller than the radius R1 (R2<R1), so that the signal receivable area E2 of the repeater 50 is much smaller than the signal receivable area E1 of the portable machine 20. The signal receivable area E1 exemplifies a "reception region" according to one or more embodiments of the disclosure.

Figure 5:
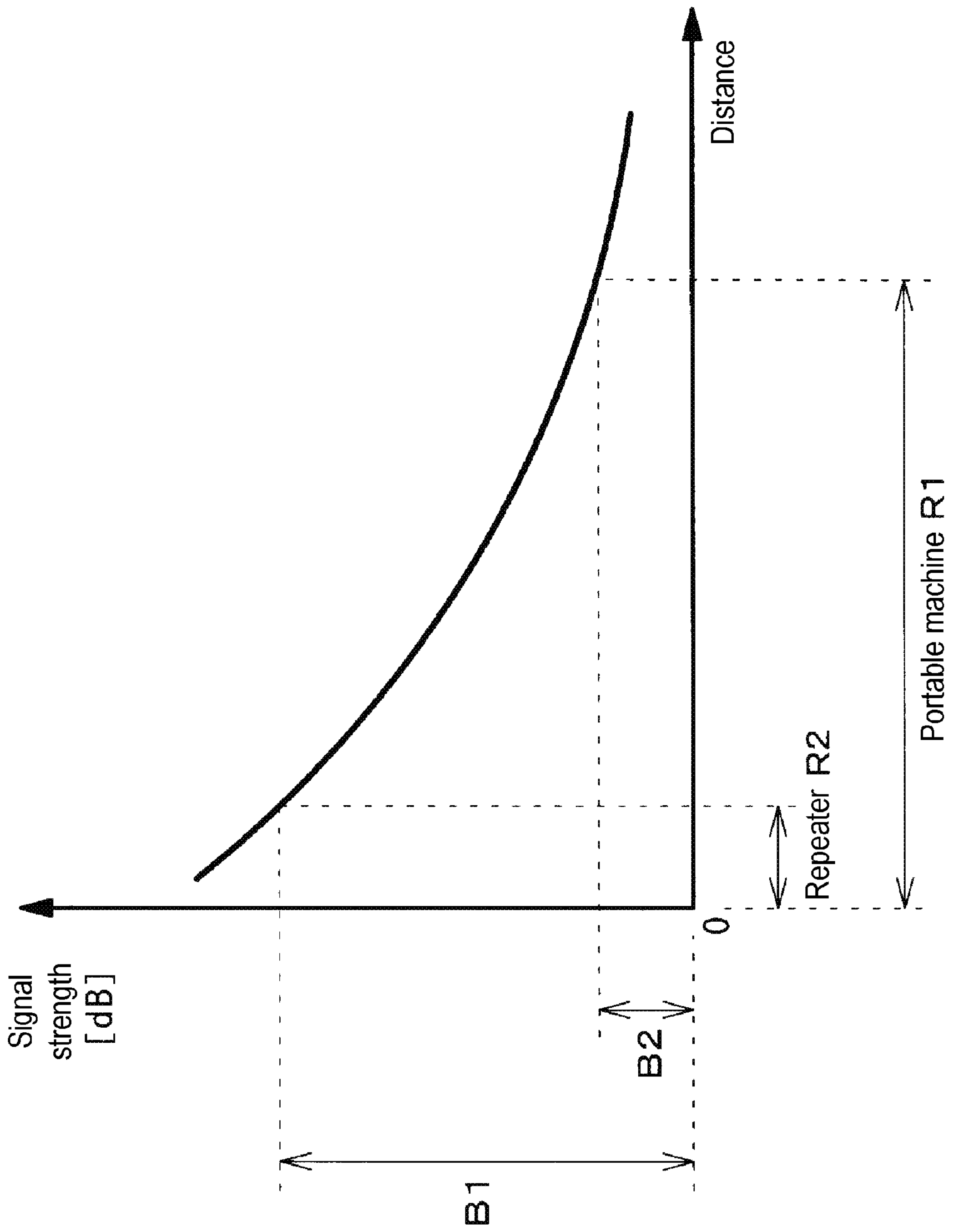
FIG. 5 is a graph indicating a relation between a distance and strength of a signal received by each of the portable machine and the repeater.

FIG. 5 is a graph indicating a relation between a distance and strength (the RSSI value) of a signal received by each of the portable machine 20 and the repeater 50. The portable machine 20 has a signal receivable distance R1 (e.g. several meters) longer than a signal receivable distance R2 (e.g. several centimeters to several meters) of the repeater 50. Strength of a signal received by each of the portable machine 20 and the repeater 50 is lower as the distance from the originator is longer. The portable machine 20 has minimum receivable signal strength B2 lower than minimum receivable signal strength B1 of the repeater 50. The repeater 50 accordingly has signal reception sensitivity lower than that of the portable machine 20.

FIGS. 6A to 8B are exemplary views of locations of the signal receivable areas E1 and E2 of the portable machine 20 and the repeater 50. When the portable machine 20 approaches one of the transmission antennas 2*a* to 6*a* (the transmission antenna 4*a* in this case) of the vehicle 30 at a predetermined distance D1 as exemplified in FIG. 6A, only this transmission antenna enters the signal receivable area E1 of the portable machine 20. The LF receiver 22 in the portable machine 20 can thus receive a response request signal transmitted from one of the LF transmitters 2 to 6. The distance D1 is larger than the radius R2 of the signal receivable area E2 of the repeater 50 and is not more than the radius R1 of the signal receivable area E1 of the portable machine 20.

Figure 6A:
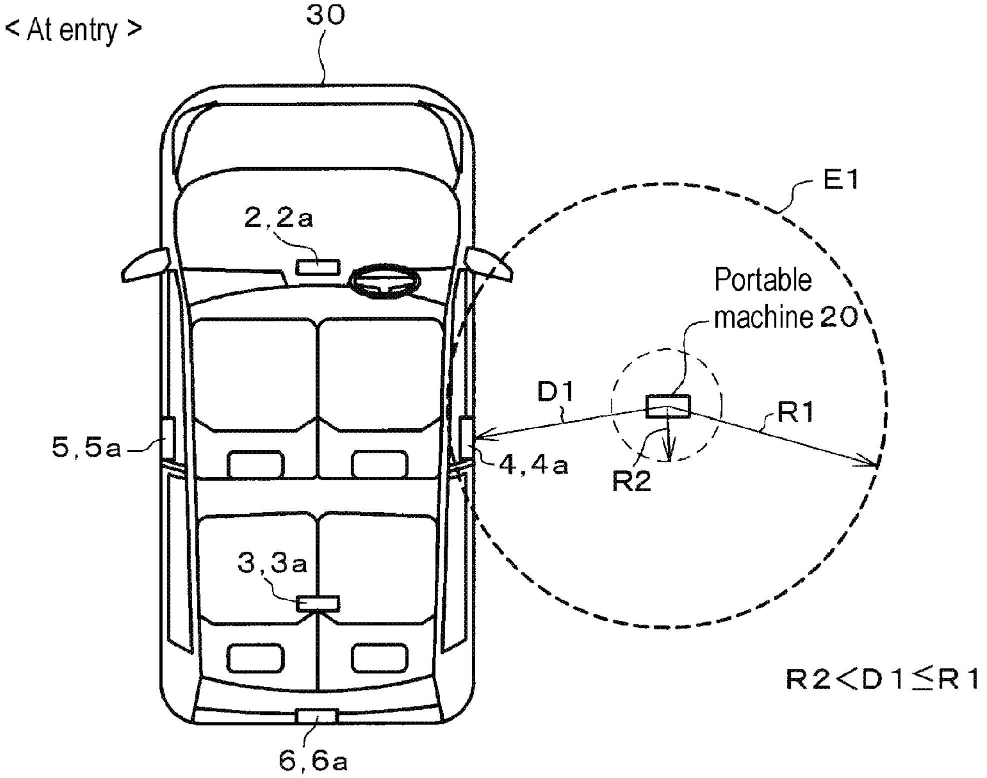
FIGS. 6A and 6B are exemplary views of locations of the signal receivable areas of the portable machine and the repeater at entry.
Figure 6B:
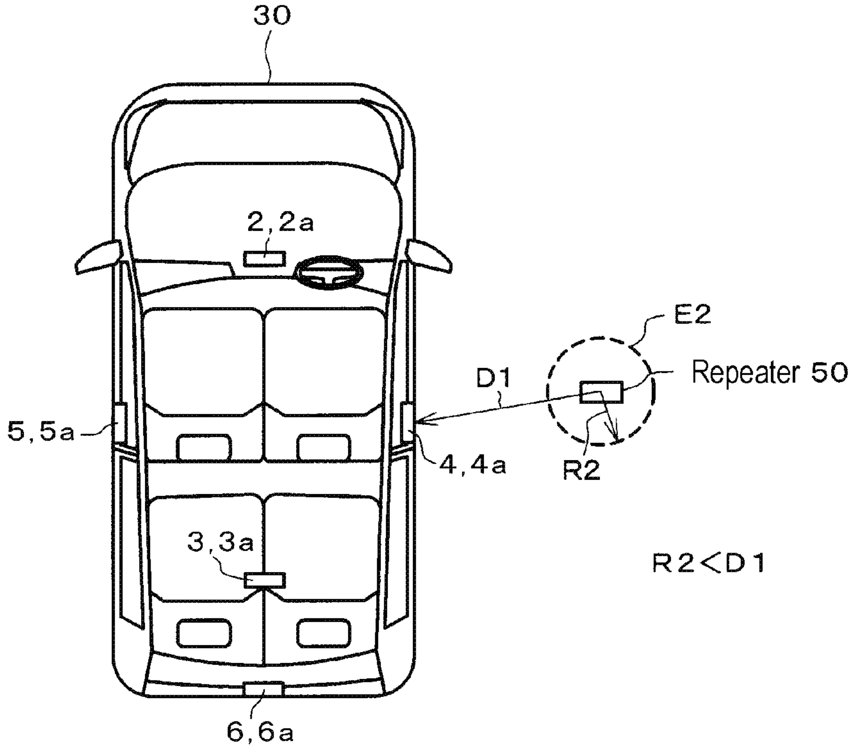

When the repeater 50 is located away from one of the transmission antennas 2*a* to 6*a* (the transmission antenna 4*a* in this case) of the vehicle 30 at the predetermined distance D1 or more as exemplified in FIG. 6B, none of the transmission antennas 2*a* to 6*a* of the LF transmitters 2 to 6 enters the signal receivable area E2 of the repeater 50. The LF receiver 22 in the portable machine 20 thus receives none of response request signals transmitted from the transmission antennas 2*a* to 6*a* via the repeater 50.

Figure 7A:
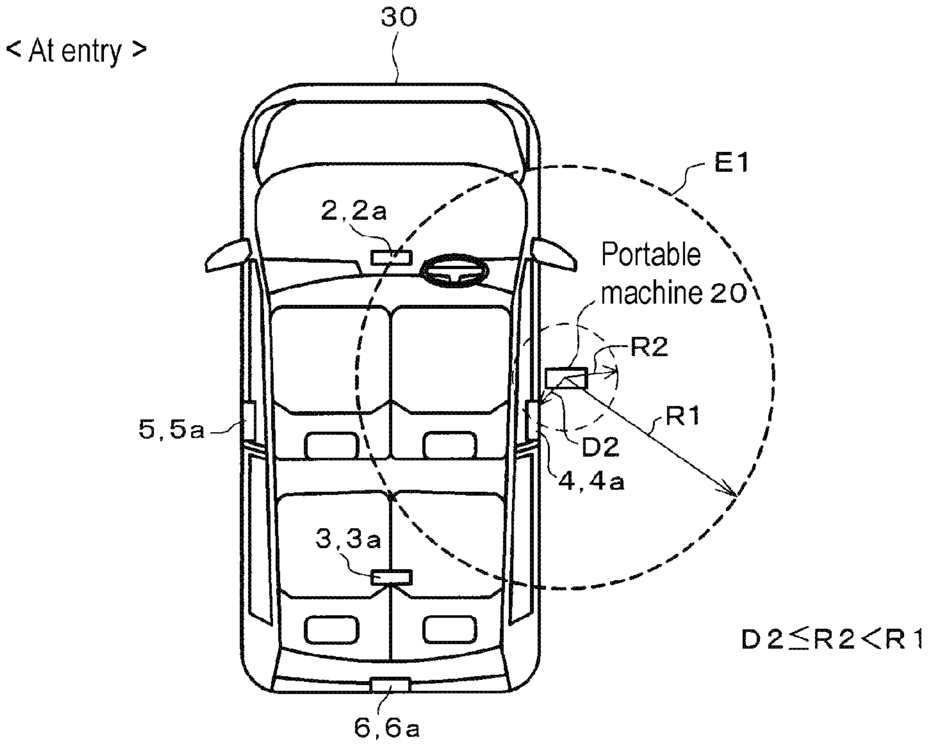
FIGS. 7A and 7B are different exemplary views of locations of the signal receivable areas of the portable machine and the repeater at entry.
Figure 8A:
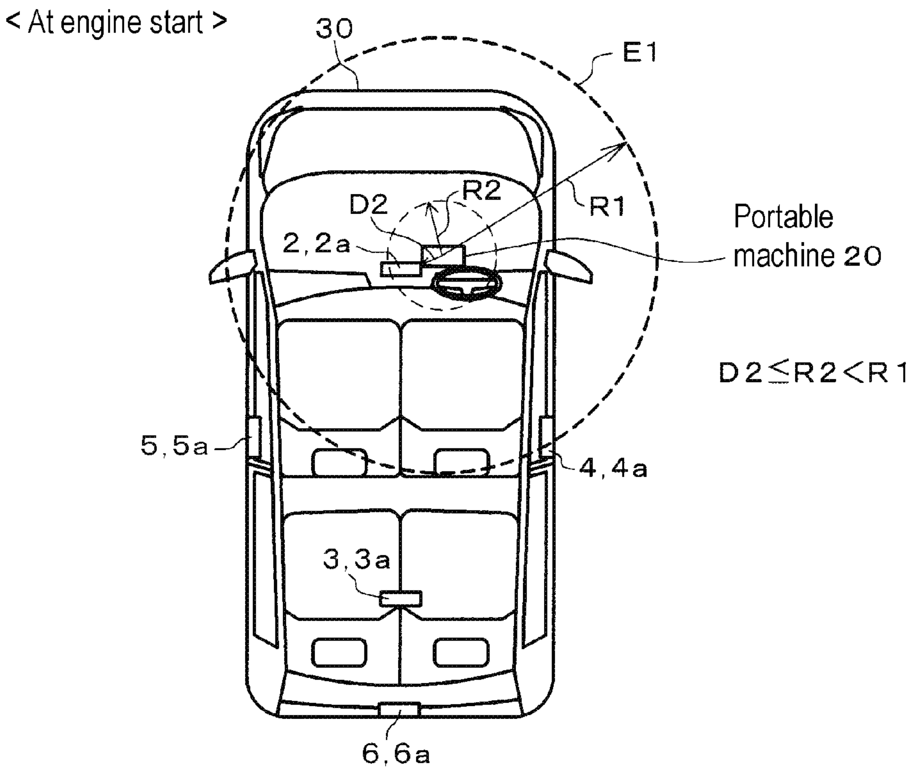
FIGS. 8A and 8B are exemplary views of locations of the signal receivable areas of the portable machine and the repeater at engine start.

When the portable machine 20 approaches one of the transmission antennas 2*a* to 6*a* of the vehicle 30 at a predetermined distance D2 as exemplified in FIGS. 7A and 8A, the transmission antenna having approached and at least one of the remaining transmission antennas enter the signal receivable area E1 of the portable machine 20. Specifically, in the case depicted in FIG. 7A, the transmission antenna 4*a* approached by the portable machine 20 as well as the transmission antenna 2*a* enter the signal receivable area E1. In the case depicted in FIG. 8A, the transmission antenna 2*a* approached by the portable machine 20 as well as the transmission antenna 4*a* enter the signal receivable area E1. The LF receiver 22 in the portable machine 20 can thus receive response request signals transmitted from at least two of the LF transmitters 2 to 6. The distance D2 is smaller than the radius R1 of the signal receivable area E1 of the portable machine 20 and is not more than the radius R2 of the signal receivable area E2 of the repeater 50.

Figure 7B:
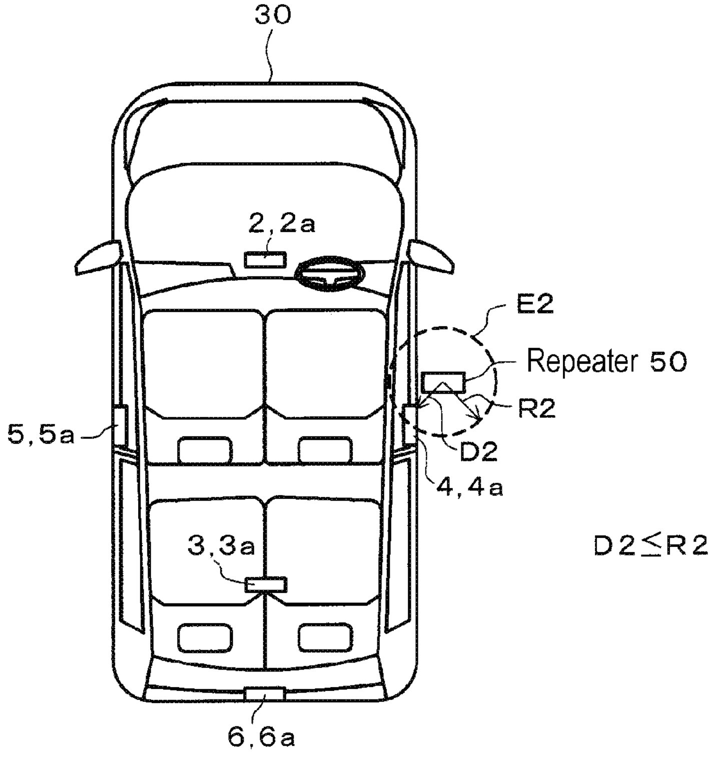
Figure 8B:
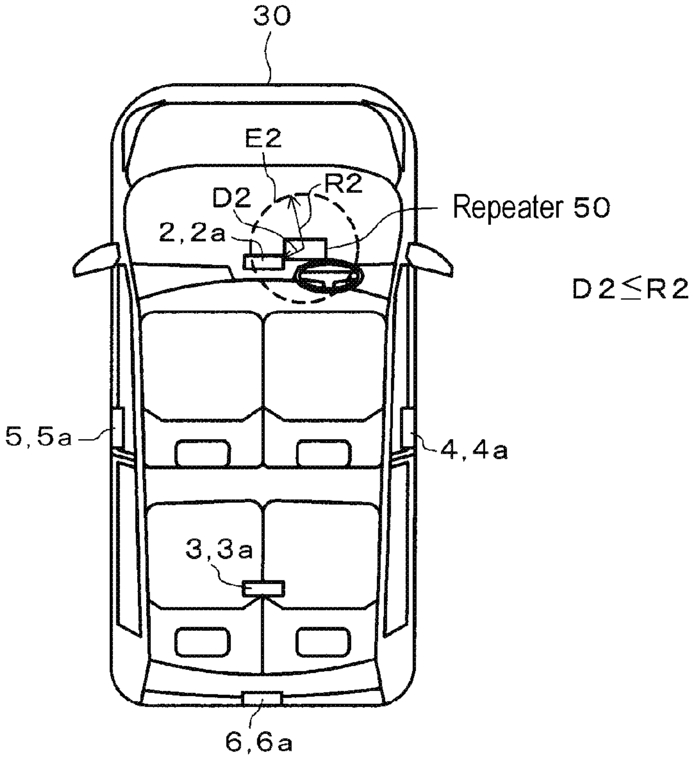

When the repeater 50 approaches one of the transmission antennas 2*a* to 6*a* of the vehicle 30 at the predetermined distance D2 as depicted in FIGS. 7B and 8B, only this transmission antenna enters the signal receivable area E2 of the repeater 50. Specifically, in the case depicted in FIG. 7B, only the transmission antenna 4*a* approached by the repeater 50 enters the signal receivable area E2 and none of the remaining transmission antennas 2*a*, 3*a*, 5*a*, and 6*a* enters the signal receivable area E2. In the case depicted in FIG. 8B, only the transmission antenna 2*a* approached by the repeater 50 enters the signal receivable area E2 and none of the remaining transmission antennas 3*a* to 6*a* enters the signal receivable area E2. The LF receiver 22 in the portable machine 20 can thus receive a response request signal transmitted from one of the LF transmitters 2 to 6 via the repeater 50.

The distance D1 is set such that the repeater 50 having approached one of the transmission antennas 2*a* to 6*a* at the distance D1 cannot receive response request signals from any of the transmission antennas 2*a* to 6*a* and the portable machine 20 having approached one of the transmission antennas 2*a* to 6*a* at the distance D1 can receive a response request signal only from this transmission antenna. The distance D1 exemplifies a "first distance" according to one or more embodiments of the disclosure.

The distance D2 is set such that the repeater 50 having approached one of the transmission antennas 2*a* to 6*a* at the distance D2 can receive a response request signal only from this transmission antenna and the portable machine 20 having approached one of the transmission antennas 2*a* to 6*a* at the distance D2 can receive response request signals from this transmission antenna and at least one of the remaining transmission antennas. The distance D2 is shorter than the distance D1 (D2<D1) and exemplifies a "second distance" according to one or more embodiments of the disclosure.

As described above, the vehicle control device 10 and the portable machine 20 become communicable with each other when at least one of the transmission antennas 2*a* to 6*a* of the LF transmitters 2 to 6 enters the signal receivable area E1 of the portable machine 20. Specifically, at least one of the LF transmitters 2 to 6 and the UHF receiver 7 in the vehicle control device 10 transmit and receive a response request signal and a response signal to the LF receiver 22 and from the UHF transmitter 23 in the portable machine 20.

The vehicle control device 10 and the portable machine 20 become communicable with each other via the repeater 50 when at least one of the transmission antennas 2*a* to 6*a* of the LF transmitters 2 to 6 enters the signal receivable area E2. Specifically, at least one of the LF transmitters 2 to 6 and the UHF receiver 7 in the vehicle control device 10 transmit and receive a response request signal and a response signal to the LF receiver 22 and from the UHF transmitter 23 in the portable machine 20 via the repeater 50.

The vehicle control device 10 communicates with the portable machine 20 and collates a preliminarily stored ID code with an ID code applied to the portable machine 20. If these ID codes match, in other words, if matching is successful, predetermined control to the vehicle 30 is permitted.

Specifically, when a user carrying the portable machine 20 operates the passive request switch 13, the controller 1 receives a corresponding operation signal. The controller 1 then communicates with the portable machine 20 using the LF transmitters 2 to 6 and the UHF receiver 7 to collate ID codes. If matching is successful, the controller 1 controls the door lock device 15 to lock or unlock each of the doors of the vehicle 30. (Passive entry method)

When a user carrying the portable machine 20 and approaching the vehicle 30 operates the operation unit 24 in the portable machine 20, the controller 21 causes the UHF transmitter 23 to transmit a signal according to the operation. When the UHF receiver 7 in the vehicle control device 10 receives the signal according to the operation to the operation unit 24, the controller 1 collates ID codes. If matching is successful, the controller 1 controls the door lock device 15 to lock or unlock the doors of the vehicle 30. (Keyless entry method)

When a user carrying the portable machine 20 operates the engine switch 14, the controller 1 receives a corresponding operation signal. The controller 1 then communicates with the portable machine 20 to collate ID codes. If matching is successful, the controller 1 controls the engine device 16 to start or stop the engine of the vehicle 30.

The vehicle control device 10 and the portable machine 20 can communicate with each other in accordance with the polling method instead of the passive entry method (The same applies to a second embodiment to be described later).

The vehicle control device 10 and the portable machine 20 according to the first embodiment will be described next in terms of their behavior with reference to FIGS. 6A to 10.

Figure 9:
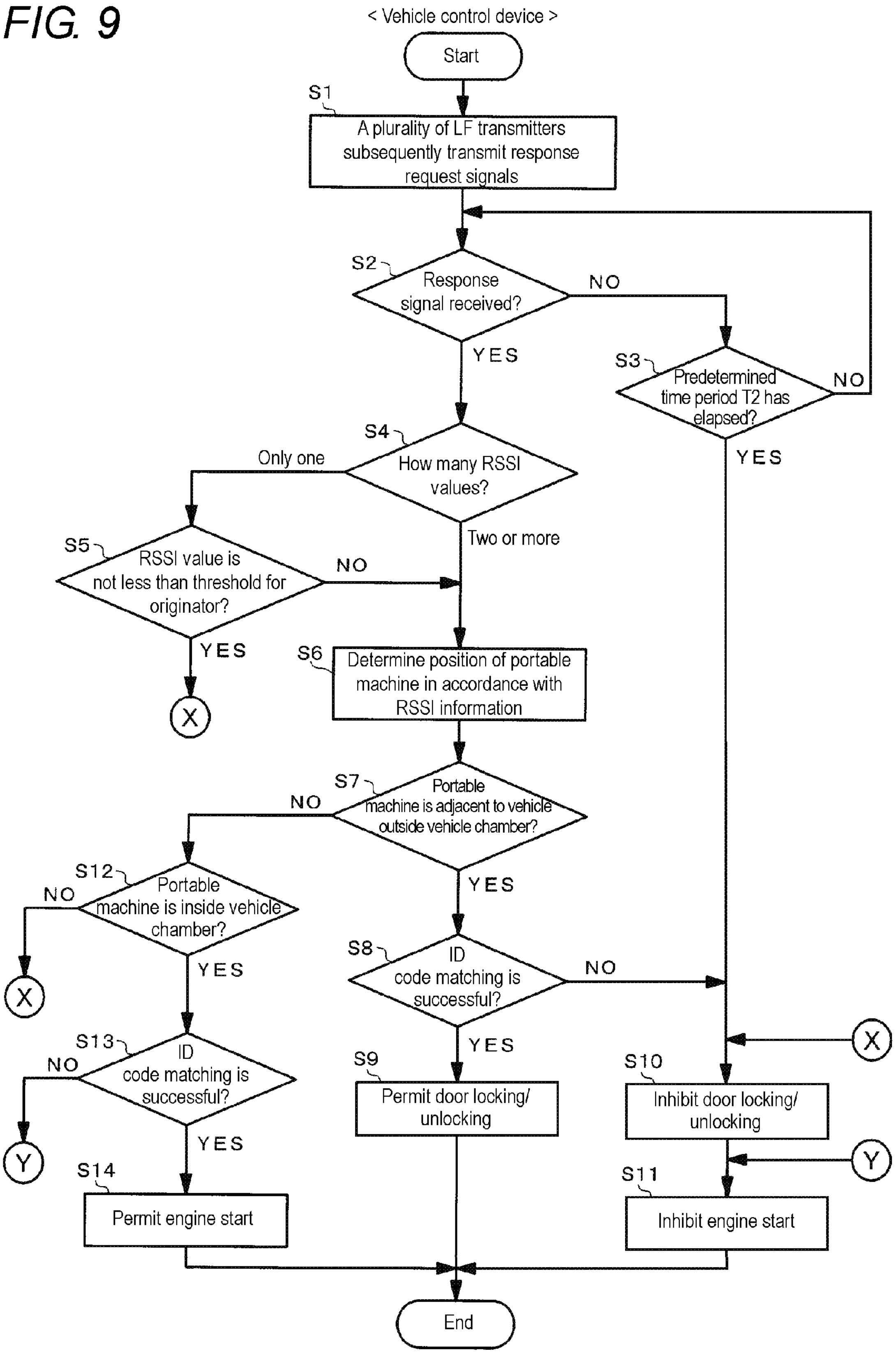
FIG. 9 is a flowchart of behavior of a vehicle control device according to a first embodiment of the disclosure.
Figure 10:
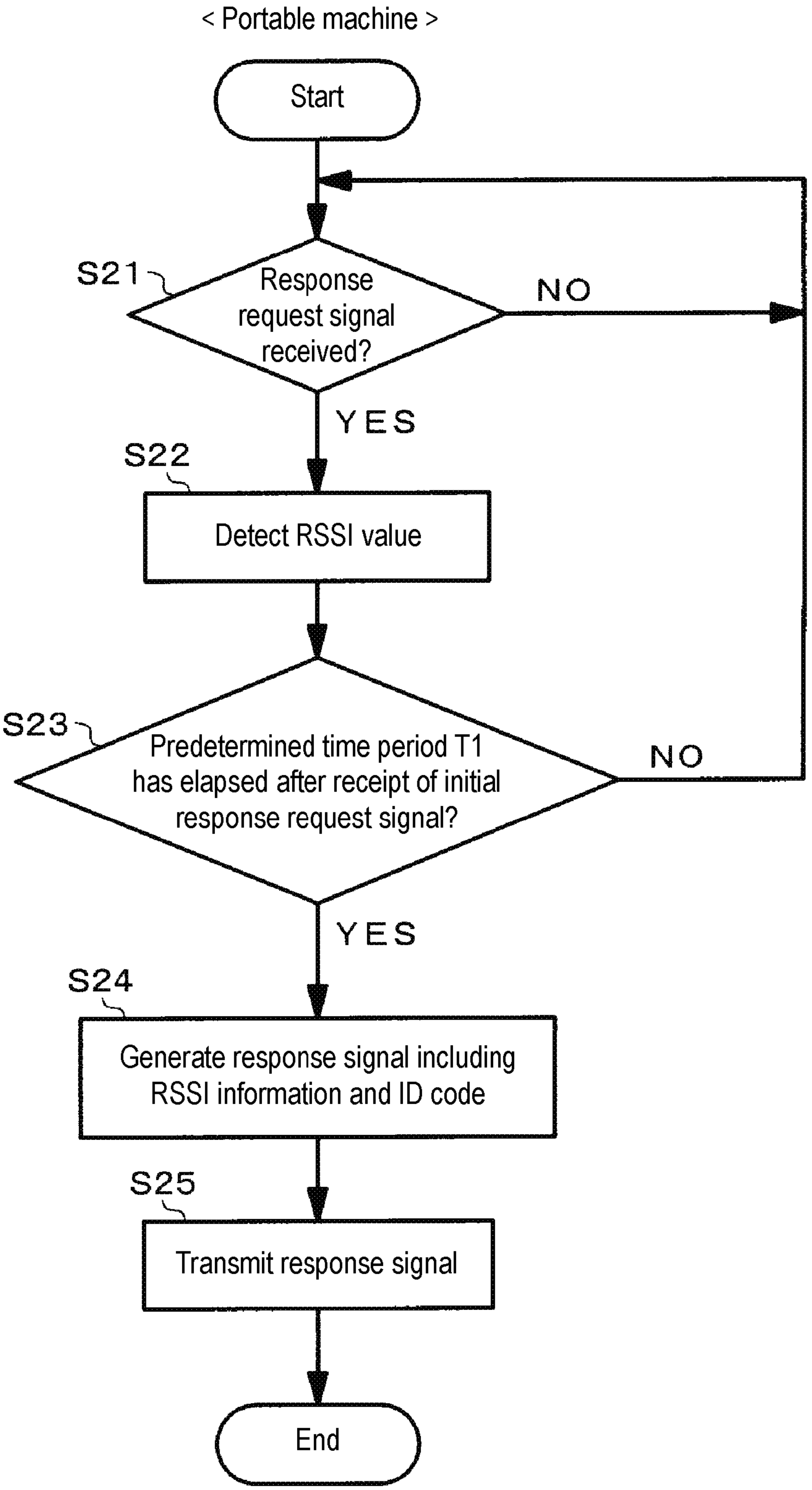
FIG. 10 is a flowchart of behavior of a portable machine according to the first embodiment of the disclosure.

FIG. 9 is a flowchart of behavior of the vehicle control device 10 according to the first embodiment. FIG. 10 is a flowchart of behavior of the portable machine 20 according to the first embodiment. According to the first embodiment, the memory 1*a* of the controller 1 in the vehicle control device 10 preliminarily stores information on the thresholds indicated in FIG. 3.

According to the passive entry method, when the passive request switch 13 is operated, the controller 1 in the vehicle control device 10 causes the LF transmitters 2 to 6 to transmit response request signals in a predetermined order (step S1 in FIG. 9). The LF transmitters 2 to 6 each transmit the response request signal at the timing sequentially delayed at a predetermined interval. According to the polling method, the LF transmitters 2 to 6 transmit response request signals intermittently at predetermined cycles while the vehicle 30 stops, for example.

If the portable machine 20 and the repeater 50 are located away from the vehicle 30 and the transmission antennas 2*a* to 6*a* of the LF transmitters 2 to 6 are not located in their signal receivable areas E1 and E2, the LF receiver 22 in the portable machine 20 does not receive the response request signals from the LF transmitters 2 to 6 (NO in step S21 in FIG. 10). Accordingly, with no response signal transmitted from the UHF transmitter 23 in the portable machine 20 and no response signal received by the UHF receiver 7 in the vehicle control device 10 (NO in step S2 in FIG. 9), a predetermined time period T2 elapses (YES in step S3 in FIG. 9).

In this case, the controller 1 inhibits locking and unlocking the doors of the vehicle 30 (step S10 in FIG. 9), and also inhibits engine start (step S11 in FIG. 9). The doors will not be locked or unlocked even if a malicious third party operates the passive request switch 13 using the repeater 50 or approaches the vehicle 30 closely. Moreover, the engine will not start even if a malicious third party operates the engine switch 14.

If the portable machine 20 or the repeater 50 approaches the vehicle 30 and at least one of the transmission antennas 2*a* to 6*a* of the LF transmitters 2 to 6 enters either one of the signal receivable areas E1 and E2, the LF receiver 22 in the portable machine 20 receives the response request signal from one of the LF transmitters 2 to 6 (YES in step S21 in FIG. 10). The RSSI detector 22*b* then detects an RSSI value of the response request signal thus received (step S22 in FIG. 10). The controller 21 associates the RSSI value of the response request signal detected by the RSSI detector 22*b* with identification information on the corresponding one of the LF transmitters 2 to 6 that are the originators of the response request signal, and stores the same as RSSI information in the memory 21*a* as needed. The RSSI information exemplifies "reception information" according to one or more embodiments of the disclosure.

When the portable machine 20 approaches any of the transmission antennas 2*a* to 6*a* at the distance D2 as exemplified in FIG. 7A, at least two of the transmission antennas 2*a* to 6*a* enter the signal receivable area E1 of the portable machine 20. Accordingly, the portable machine 20 initially receives the response request signal from one of the LF transmitters 2 to 6 (YES in step S21 in FIG. 10), and then receives the response request signal from another one of the LF transmitters 2 to 6 (YES in step S21 in FIG. 10) before a predetermined time period T1 elapses (NO in step S23 in FIG. 10). The RSSI detector 22*b* then detects an RSSI value of each of the response request signals thus received (step S22 in FIG. 10).

When the portable machine 20 approaches any of the transmission antennas 2*a* to 6*a* at the distance D1 as exemplified in FIG. 6A, only one of the transmission antennas 2*a* to 6*a* of the LF transmitters 2 to 6 enters the signal receivable area E1 of the portable machine 20. Accordingly, the portable machine 20 initially receives the response request signal from one of the LF transmitters 2 to 6 (YES in step S21 in FIG. 10), and receives no response request signal from another one of the LF transmitters 2 to 6 while the predetermined time period T1 elapses (YES in step S23 in FIG. 10).

When the portable machine 20 is located away from the vehicle 30 and the repeater 50 approaches any of the transmission antennas 2*a* to 6*a* at the distance D2 as depicted in FIG. 7B, only one of the transmission antennas 2*a* to 6*a* of the LF transmitters 2 to 6 enters the signal receivable area E2 of the repeater 50. This is so-called relay attack. In this case, the portable machine 20 initially receives the response request signal from one of the LF transmitters 2 to 6 (YES in step S21 in FIG. 10), and receives no response request signal from another one of the LF transmitters 2 to 6 while the predetermined time period T1 elapses (YES in step S23 in FIG. 10).

The predetermined time period T1 is set to be short such that, even if the repeater 50 is moved by a person after one of the transmission antennas 2*a* to 6*a* of the LF transmitters 2 to 6 enters the signal receivable area E2 of the repeater 50, another one of the transmission antennas 2*a* to 6*a* of the LF transmitters 2 to 6 does not enter the signal receivable area E2.

If the predetermined time period T1 elapses after initial reception of the response request signal (YES in step S23 in FIG. 10), the controller 21 generates a response signal including RSSI information indicative of the RSSI values of all the response request signals detected by the RSSI detector 22*b* and the like and the ID codes preliminarily stored in the memory 21*a* (step S24 in FIG. 10). The controller 21 subsequently causes the UHF transmitter 23 to transmit the response signal thus generated to the vehicle control device 10 (step S25 in FIG. 10). Thereafter, a reception record of the response request signals (e.g. the RSSI information) and measurement information on the predetermined time period T1 are cleared in the portable machine 20.

For example, after the LF transmitters 2 to 6 transmit response request signals (step S1 in FIG. 9) and before the predetermined time period T2 elapses (NO in step S3 in FIG. 9), the UHF receiver 7 in the vehicle control device 10 receives the response signal from the portable machine 20 (YES in step S2 in FIG. 9).

The predetermined time period T2 is set to be equivalent to or slightly longer than an ordinary time period from the time point when the LF transmitters 2 to 6 transmit response request signals to the time point when the UHF receiver 7 receives a response signal from the portable machine 20 in an exemplary case where a user carrying the portable machine 20 approaches the vehicle 30 for boarding.

Upon receipt of the response signal, the controller 1 refers to the RSSI information included in the response signal and checks the number of RSSI values of the response request signals (step S4 in FIG. 9). If the number of RSSI values of the response request signals is two or more, the portable machine 20 have received the response request signals transmitted from at least two of the LF transmitters 2 to 6. This indicates proper entry of the portable machine 20 as depicted in FIG. 7A. The controller 1 determines the position of the portable machine 20 in accordance with the RSSI information in this case (step S6 in FIG. 9).

If the number of RSSI values of the response request signals is only one in step S4 in FIG. 9, the controller 1 detects the originator of the response request signal out of the LF transmitters 2 to 6 in accordance with the RSSI information and reads out the threshold corresponding to the detected one of the LF transmitters 2 to 6 from the memory 1*a*. The controller 1 subsequently determines whether or not the RSSI value of the response request signal is not less than the threshold for the originator (step S5 in FIG. 9).

If the RSSI value of the response request signal is not less than the threshold for the originator (YES in step S5 in FIG. 9), relay attack as depicted in FIG. 7B has been committed. In this case, the controller 1 inhibits door locking/unlocking (step S10 in FIG. 9), and also inhibits starting the engine of the vehicle 30 (step S11 in FIG. 9).

If the RSSI value of the response request signal is less than the threshold for the originator (NO in step S5 in FIG. 9), proper entry to the portable machine 20 as depicted in FIG. 6A has been performed. The controller 1 determines the position of the portable machine 20 in accordance with the RSSI information in this case (step S6 in FIG. 9).

If the controller 1 determines that the portable machine 20 is located adjacent to the vehicle 30 outside the vehicle chamber (YES in step S7 in FIG. 9), the controller 1 collates the ID code of the portable machine 20 included in the response signal with the ID code preliminarily stored in the memory 1*a*. If matching of the ID codes is unsuccessful (NO in step S8 in FIG. 9), the controller 1 inhibits door locking/unlocking (step S10 in FIG. 9), and also inhibits starting the engine of the vehicle 30 (step S11 in FIG. 9).

In contrast, if matching of the ID codes is successful (YES in step S8 in FIG. 9), the controller 1 permits door locking/unlocking (step S9 in FIG. 9). The door lock device 15 accordingly unlocks the doors of the vehicle 30 so as to allow a user carrying the portable machine 20 to enter the vehicle chamber.

If the user subsequently enters the vehicle 30 and the portable machine 20 is placed in the vehicle chamber as depicted in FIG. 8A, at least two of the transmission antennas 2*a* to 6*a* of the LF transmitters 2 to 6 enter the signal receivable area E1 of the portable machine 20. As described above, the LF receiver 22 in the portable machine 20 thus receives, within the predetermined time period T1, at least two of the response request signals transmitted from the LF transmitters 2 to 6 in step S1 in FIG. 9 (step S21 in FIG. 10). Furthermore, the RSSI detector 22*b* detects the RSSI value of each of the response request signals (step S22 in FIG. 10). After the predetermined time period T1 elapses (YES in step S23 in FIG. 10), the controller 21 generates a response signal including the RSSI information and the ID code (step S24 in FIG. 10) and the UHF transmitter 23 transmits the response signal to the vehicle control device 10 (step S25 in FIG. 10).

The UHF receiver 7 in the vehicle control device 10 receives the response signal from the portable machine 20 as described above (YES in step S2 in FIG. 9). The controller 1 then determines that the response signal includes at least two RSSI values of the response request signals (step S4 in FIG. 9). As this is proper engine confirmation by the portable machine 20 as depicted in FIG. 8A in this case, the controller 1 subsequently determines the position of the portable machine 20 (step S6 in FIG. 9).

If the controller 1 determines that the portable machine 20 is located not adjacent to the vehicle 30 outside the vehicle chamber (NO in step S7 in FIG. 9) but in the vehicle chamber (YES in step S12 in FIG. 9), the controller 1 collates the ID code of the portable machine 20 included in the response signal with the ID code preliminarily stored in the memory 1*a*. If matching of the ID codes is unsuccessful (NO in step S13 in FIG. 9), the controller 1 inhibits engine start (step S11 in FIG. 9).

In contrast, if the engine switch 14 is turned ON and matching of the ID codes is successful (YES in step S13 in FIG. 9), the controller 1 permits engine start (step S14 in FIG. 9). The engine device 16 accordingly starts the engine of the vehicle 30 so that the vehicle 30 is ready to be driven.

If the position of the portable machine 20 determined in step S6 in FIG. 9 is neither adjacent to the vehicle 30 outside the vehicle chamber (NO in step S7 in FIG. 9) nor inside the vehicle chamber (NO in step S12 in FIG. 9), the controller 1 inhibits door locking/unlocking (step S10 in FIG. 9), and also inhibits starting the engine of the vehicle 30 (step S11 in FIG. 9).

When the repeater 50 is somehow improperly placed in the vehicle chamber as depicted in FIG. 8B, one of the transmission antennas 2*a* to 6*a* of the LF transmitters 2 to 6 enters the signal receivable area E2 of the repeater 50. As described above, the LF receiver 22 in the portable machine 20 thus receives, within the predetermined time period T1, one of the response request signals transmitted from the LF transmitters 2 to 6 in step S1 in FIG. 9 (step S21 in FIG. 10). In this case, after the predetermined time period T1 elapses (YES in step S23 in FIG. 10), the controller 21 generates a response signal including RSSI information indicative of one RSSI value and the ID code (step S24 in FIG. 10) and the UHF transmitter 23 transmits the response signal to the vehicle control device 10 (step S25 in FIG. 10).

After the UHF receiver 7 in the vehicle control device 10 receives the response signal from the portable machine 20 (YES in step S2 in FIG. 9) as described above, the controller 1 determines that the response signal includes only one RSSI value of the response request signal (step S4 in FIG. 9). The controller 1 also determines that the RSSI value of the response request signal is not less than the threshold for the originator (YES in step S5 in FIG. 9). The controller 1 then inhibits door locking/unlocking (step S10 in FIG. 9), and also inhibits starting the engine of the vehicle 30 (step S11 in FIG. 9).

After the processing in step S9, S11, or S14 in FIG. 9 is executed, a reception record and the content of the response signal as well as measurement information on the predetermined time period T2 are cleared in the vehicle control device 10.

According to the first embodiment, when the portable machine 20 is located far away and the repeater 50 having reception sensitivity much lower than that of the portable machine 20 approaches the vehicle 30, the portable machine 20 receives, within the predetermined time period T1 via the repeater 50, a response request signal transmitted from one of the LF transmitters 2 to 6 provided to the vehicle 30. The response request signal has a high RSSI value not less than the corresponding threshold, so that control to the vehicle 30 can be inhibited in this case.

In contrast, when the portable machine 20 approaches the vehicle 30 and receives, within the predetermined time period T1, response request signals transmitted from at least two of the LF transmitters 2 to 6, control to the vehicle 30 can be permitted.

When the portable machine 20 approaches the vehicle 30 and receives, within the predetermined time period, a response request signal transmitted from only one of the LF transmitters 2 to 6, the response request signal has a low RSSI value less than the threshold. Control to the vehicle 30 can be permitted in this case.

In summary, control to the vehicle 30 can be permitted or inhibited in accordance with determination whether the number of originators of response request signals received by the portable machine 20 within the predetermined time period T1 is one or at least two, as well as determination whether or not the response request signal received from one of the originators has a RSSI value not less than the threshold. It is thus possible to improve security against relay attack using the repeater 50 without complication of the processing performed by the vehicle control device 10 and the portable machine 20.

The threshold to be compared with a RSSI value of a response request signal has a fixed value and is stored in the memory 1*a* of the controller 1 in the vehicle control device 10. The processing performed by the vehicle control device 10 and the portable machine 20 is thus simplified in comparison to the case where the threshold is varied in each case. Furthermore, the portable machine 20 is communicable with the vehicle control device 10 and control to the vehicle 30 is permitted even at the distance D1 from the vehicle 30 incommunicable with the repeater 50. Security can thus be improved without deterioration in user convenience.

The plurality of thresholds to be compared with RSSI values of response request signals are set so as to correspond to the LF transmitters 2 to 6 in the first embodiment. The RSSI value of the response request signal from any of the LF transmitters 2 to 6 received by the portable machine 20 within the predetermined time period T1 is compared with the threshold for the corresponding one of the LF transmitters 2 to 6 that are signal originators. Whether or not the portable machine 20 approaches each portion of the vehicle 30 can thus be detected accurately to permit or inhibit control to the vehicle 30. The thresholds each have a fixed value so as to restrain complication of the processing performed by the vehicle control device 10 and the portable machine 20.

The portable machine 20 according to the first embodiment transmits, to the vehicle control device 10, a response signal including RSSI information in which a RSSI value of a response request signal received within the predetermined time period T1 is associated with identification information on corresponding one of the LF transmitters 2 to 6 that are the originators of the response request signal. After the vehicle control device 10 receives the response signal from the portable machine 20, determined in accordance with the RSSI information is whether the portable machine 20 receives a response request signal from one of the LF transmitters 2 to 6 or response request signals from at least two of the LF transmitters 2 to 6. When a response request signal from one of the LF transmitters 2 to 6 is received, it is determined whether or not the RSSI value of the response request signal is not less than the threshold. Furthermore, the vehicle control device 10 permits or inhibits control to the vehicle 30 in accordance with at least one of the results.

Accordingly, the portable machine 20 has only to reply RSSI information on receipt of a response request signal included in a response signal as described above whereas the vehicle control device 10 has only to check the RSSI information included in the response signal. This further simplifies the processing performed by the vehicle control device 10 and the portable machine 20.

Furthermore, door locking/unlocking or engine start of the vehicle 30 is permitted in the first embodiment if the portable machine 20 receives response request signals from at least two of the LF transmitters 2 to 6 within the predetermined time period T1 or if the portable machine 20 receives a response request signal from only one of the LF transmitters 2 to 6 but the response request signal includes an RSSI value less than the threshold. In contrast, door locking/unlocking or engine start of the vehicle 30 is inhibited if the portable machine 20 receives a response request signal from one of the LF transmitters 2 to 6 within the predetermined time period T1 and the response request signal includes an RSSI value not less than the threshold. The doors are not unlocked and the engine is not started even when a malicious third party commits relay attack using the repeater 50. It is thus possible to prevent crimes such as unauthorized entry to the vehicle chamber and a theft of the vehicle 30.

The vehicle control device 10 and the portable machine 20 according to the second embodiment will be described next in terms of their behavior with reference to FIGS. 11 and 12.

Figure 11:
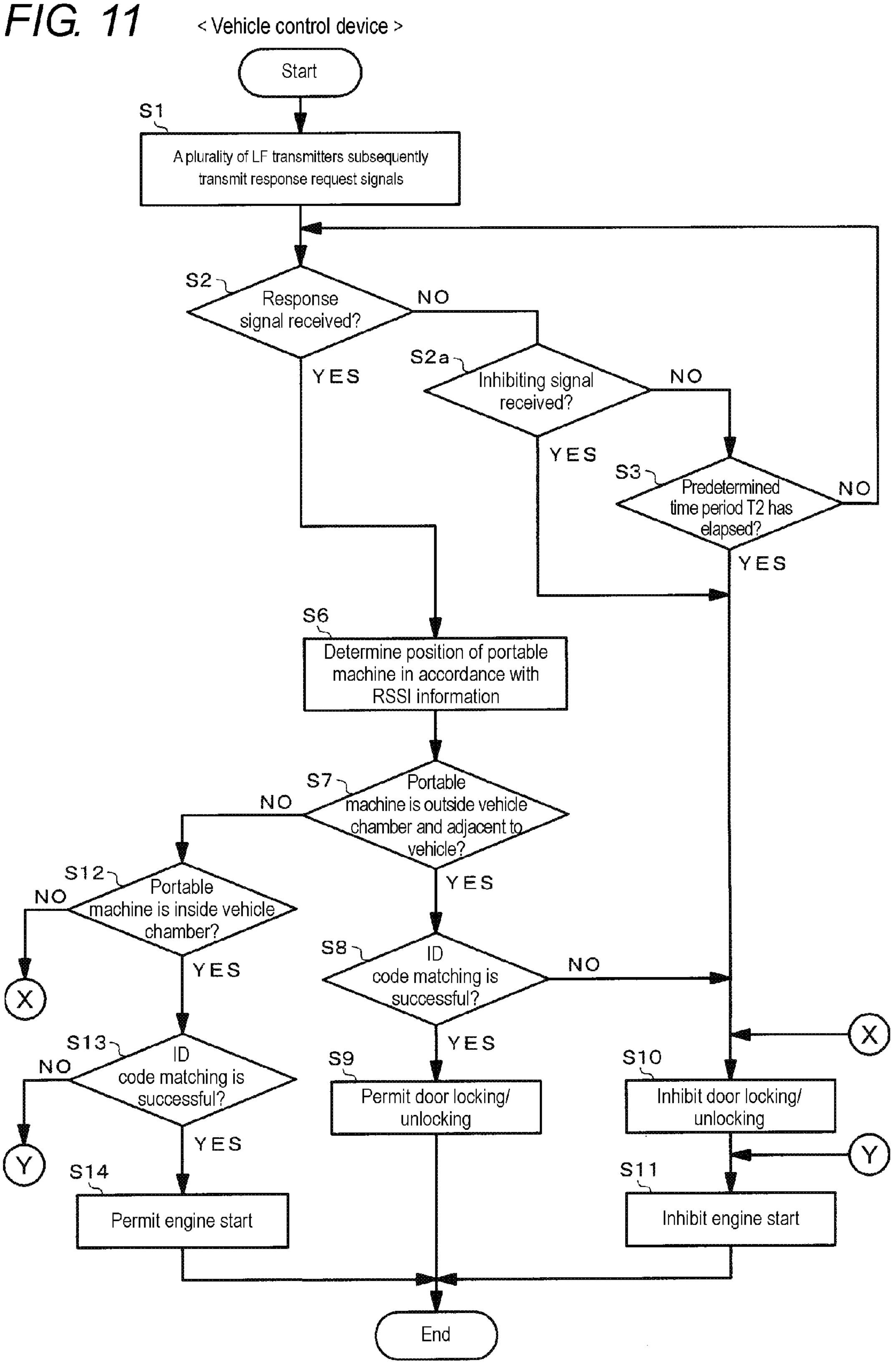
FIG. 11 is a flowchart of behavior of a vehicle control device according to a second embodiment of the disclosure.

FIG. 11 is a flowchart of behavior of the vehicle control device 10 according to the second embodiment. FIG. 12 is a flowchart of behavior of the portable machine 20 according to the second embodiment.

According to the second embodiment, not the vehicle control device 10 but the portable machine 20 determines whether or not the portable machine 20 receives response request signals from at least two of the LF transmitters 2 to 6 within the predetermined time period T1 and compares the RSSI value of only one response request signal thus received with the threshold. Furthermore, the memory 21*a* of the controller 21 in the portable machine 20 preliminarily stores the information on the thresholds indicated in FIG. 3.

Figure 12:
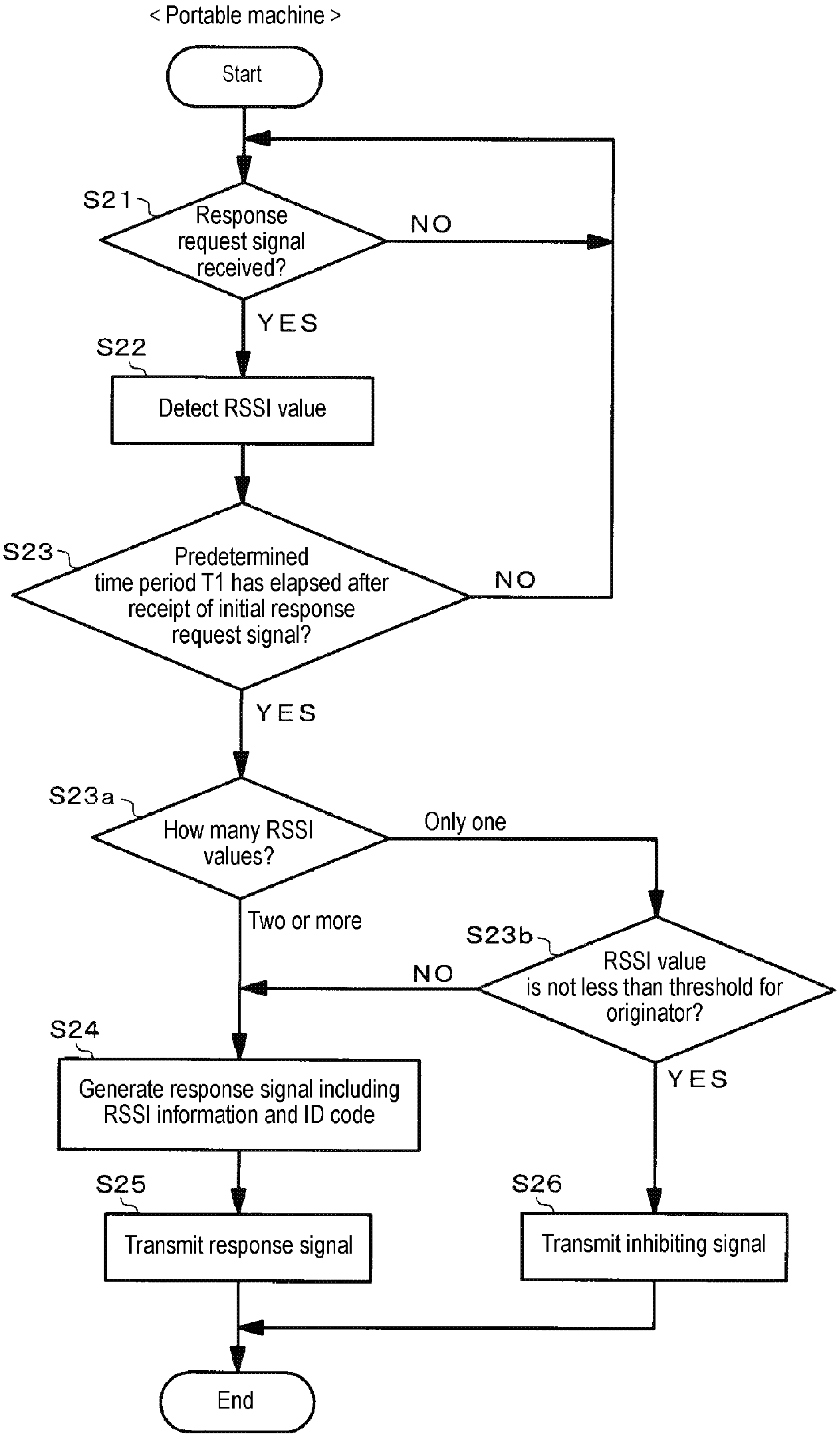
FIG. 12 is a flowchart of behavior of a portable machine according to the second embodiment of the disclosure.

Specifically, if the LF receiver 22 in the portable machine 20 receives a response request signal from one of the LF transmitters 2 to 6 in the vehicle control device 10 (YES in step S21 in FIG. 12), the RSSI detector 22*b* detects an RSSI value of the response request signal thus received (step S22 in FIG. 12). The controller 21 associates the RSSI value of the response request signal detected by the RSSI detector 22*b* with identification information on corresponding one of the LF transmitters 2 to 6 that are the originators of the response request signal, and stores the same as RSSI information in the memory 21*a* as needed.

If the predetermined time period T1 elapses after initial receipt of the response request signal from any of the LF transmitters 2 to 6 (YES in step S23 in FIG. 12), the controller 21 refers to the RSSI information stored in the memory 21*a*. The controller 21 subsequently checks the number of RSSI values of the response request signals (step S23*a* in FIG. 12).

If the number of RSSI values of the response request signals is two or more in step S23*a*, the controller 21 generates a response signal including RSSI information indicative of the RSSI values of all the response request signals and the ID codes (step S24 in FIG. 12). The controller 21 subsequently causes the UHF transmitter 23 to transmit the response signal thus generated to the vehicle control device 10 (step S25 in FIG. 12).

In contrast, if the number of RSSI values of the response request signals is only one in step S23*a*, the controller 21 detects the originator of the response request signal out of the LF transmitters 2 to 6 and reads out the threshold corresponding to the detected one of the LF transmitters 2 to 6 from the memory 21*a*. The controller 21 subsequently determines whether or not the RSSI value of the response request signal is not less than the threshold for the originator (step S23*b* in FIG. 12).

If the RSSI value of the response request signal is less than the threshold for the originator in this case (NO in step S23*b* in FIG. 12), the controller 21 generates a response signal including RSSI information indicative of the RSSI value of the response request signal and the ID code (step S24 in FIG. 12). The controller 21 subsequently causes the UHF transmitter 23 to transmit the response signal thus generated to the vehicle control device 10 (step S25 in FIG. 12).

In contrast, if the RSSI value of the response request signal is not less than the threshold for the originator (YES in step S23*b* in FIG. 12), the controller 21 causes the UHF transmitter 23 to transmit, to the vehicle control device 10, an inhibiting signal indicative of inhibition of door locking/unlocking and engine start (step S26 in FIG. 12).

Assume that, after the LF transmitters 2 to 6 transmit response request signals (step S1 in FIG. 11) and before the predetermined time period T2 elapses (NO in step S3 in FIG. 11), the UHF receiver 7 in the vehicle control device 10 receives not a response signal but an inhibiting signal from the portable machine 20 (YES in step S2*a* in FIG. 11). In this case, the controller 1 inhibits, in accordance with the inhibiting signal, door locking/unlocking (step S10 in FIG. 11), and also inhibits starting the engine of the vehicle 30 (step S11 in FIG. 11).

In contrast, assume that, after the LF transmitters 2 to 6 transmit response request signals (step S1 in FIG. 11) and before the predetermined time period T2 elapses (NO in step S3 in FIG. 11), the UHF receiver 7 in the vehicle control device 10 receives a response signal from the portable machine 20 (YES in step S2 in FIG. 11). The controller 1 determines the position of the portable machine 20 in accordance with RSSI information included in the response signal in this case (step S6 in FIG. 11). If the controller 1 determines that the portable machine 20 is located adjacent to the vehicle 30 outside the vehicle chamber (YES in step S7 in FIG. 11) and then matching of the ID codes is successful (YES in step S8 in FIG. 11), the controller 1 permits door locking/unlocking (step S9 in FIG. 11).

If the controller 1 determines that the portable machine 20 is located inside the vehicle chamber after the engine switch 14 is turned ON (YES in step S12 in FIG. 11) and matching of the ID codes is successful (YES in step S13 in FIG. 11), the controller 1 permits engine start (step S14 in FIG. 11).

According to the second embodiment, if the portable machine 20 receives response request signals from at least two of the LF transmitters 2 to 6 within the predetermined time period T1, the portable machine 20 transmits, to the vehicle control device 10, RSSI information included in a response signal. If the portable machine 20 receives a response request signal from only one of the LF transmitters 2 to 6 within the predetermined time period T1 but the response request signal includes an RSSI value less than the threshold, the portable machine 20 also transmits, to the vehicle control device 10, RSSI information included in a response signal. When the vehicle control device 10 receives the response signal, permitted in accordance with the RSSI information included in the response signal are door locking/unlocking and engine start of the vehicle 30. In other words, control to the vehicle 30 can be permitted if the vehicle control device 10 and the portable machine 20 properly communicate with each other.

In contrast, if the portable machine 20 receives a response request signal from only one of the LF transmitters 2 to 6 within the predetermined time period T1 and the response request signal includes an RSSI value not less than the threshold, the portable machine 20 transmits an inhibiting signal to the vehicle control device 10. When the vehicle control device 10 receives the inhibiting signal, door locking/unlocking and engine start of the vehicle 30 are inhibited. In other words, control to the vehicle 30 can be inhibited when relay attack is committed using the repeater 50.

It is thus possible to improve security against relay attack using the repeater 50 without complication of the processing performed by the vehicle control device 10 and the portable machine 20. The processing performed by the vehicle control device 10 can be further simplified because door locking/unlocking and engine start are inhibited with no other processing when the vehicle control device 10 receives an inhibiting signal from the portable machine 20.

The threshold has a fixed value and is stored in the memory 21*a* of the controller 21 in the portable machine 20. The processing performed by the vehicle control device 10 and the portable machine 20 is thus simplified in comparison to the case where the threshold is varied in each case. Furthermore, the portable machine 20 is communicable with the vehicle control device 10 and control to the vehicle 30 is permitted even at the distance D1 from the vehicle 30 incommunicable with the repeater 50. This improves user convenience.

The disclosure can be achieved in various embodiments in addition to those described above. An illustrative embodiment exemplifies the case where the vehicle control device 10 determines the position of the portable machine 20 in accordance with RSSI information included in a response signal received from the portable machine 20. The disclosure is, however, not limited to this case. For example, the processing performed by the vehicle control device in step S6, S7, or S12 in FIG. 9 or 11 relevant to the position of the portable machine may not be performed.

An illustrative embodiment exemplifies door locking/unlocking and engine start as control to the vehicle permitted or inhibited in the vehicle wireless communication system 100. The disclosure is, however, not limited to this case. Alternatively, either door locking/unlocking or engine start of the vehicle can be permitted or inhibited. Still alternatively, control other than the above to the vehicle can be permitted or inhibited.

An illustrative embodiment exemplifies the case where the two LF transmitters 2 and 3 are provided inside the chamber of the vehicle 30 whereas the three LF transmitters 4 to 6 are provided outside the chamber. The disclosure is, however, not limited to this case. Otherwise, one or at least three first transmitters can be provided inside the vehicle chamber whereas one, two, or at least four first transmitters can be provided outside the vehicle chamber, and each of the first transmitters can transmit a response request signal. That is, the plurality of first transmitters only needs to be provided inside and outside the vehicle chamber such that response request signals reach an area around the vehicle and the interior of the vehicle chamber.

An illustrative embodiment exemplifies the case where the disclosure is applied to the vehicle wireless communication system 100, the vehicle control device 10, and the portable machine 20 for an automatic four-wheeled vehicle. The disclosure is also applicable to a vehicle wireless communication system, a vehicle control device, and a portable machine for a vehicle of a different type such as a motorcycle or a large motor vehicle.

While the invention has been described with reference to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A vehicle wireless communication system configured to cause a vehicle control device mounted on a vehicle to control the vehicle in accordance with a wireless signal transmitted and received between the vehicle control device and a portable machine carried by a user, the vehicle control device comprising:

a first transmitter configured to transmit a response request signal to the portable machine; and a first receiver configured to receive a response signal from the portable machine;

the portable machine comprising:

a second receiver configured to receive the response request signal from the vehicle control device;

a reception strength detector configured to detect reception strength of the response request signal received by the second receiver; and a second transmitter configured to transmit the response signal to the vehicle control device in reply to the response request signal received by the second receiver;

wherein the first transmitter comprises a plurality of first transmitters to allow the response request signals to reach an area around the vehicle and an interior of a vehicle chamber, wherein the second receiver has a predetermined reception region in which the response request signals are receivable, wherein in the reception region, when the portable machine approaches one of the first transmitters at a predetermined first distance, the response request signal only from the first transmitter is receivable by the portable machine, and when the portable machine approaches one of the first transmitters at a predetermined second distance shorter than the first distance, the response request signals from the first transmitter and any of the remaining first transmitters are receivable by the portable machine, wherein control to the vehicle is inhibited if the second receiver receives the response request signal from only one of the first transmitters within a predetermined time period and the reception strength of the response request signal is not less than a preliminarily set threshold, and wherein control to the vehicle is permitted if the second receiver receives the response request signals from at least two of the first transmitters within the predetermined time period or if the second receiver receives the response request signal from only one of the first transmitters within the predetermined time period and the reception strength of the response request signal is less than the threshold.

2. The vehicle wireless communication system according to claim 1, wherein the threshold is set for each of the first transmitters, and wherein the reception strength of the response request signal transmitted from any of the first transmitters and received by the second receiver within the predetermined time period is compared with the threshold corresponding to the first transmitter.

3. The vehicle wireless communication system according to claim 1, wherein the portable machine causes the second transmitter to transmit the response signal comprising reception information in which the reception strength of the response request signal received within the predetermined time period is associated with identification information on the first transmitter that is an originator of the response request signal, wherein the vehicle control device further comprises a first storage configured to store the thresholds, determines, after the first receiver receives the response signal, whether or not the portable machine receives the response request signals from at least two of the first transmitters within the predetermined time period in accordance with the reception information comprised in the response signal, or compares, when the portable machine receives the response request signal from only one of the first transmitters within the predetermined time period, the reception strength of the response request signal with the threshold, and permits or inhibits control to the vehicle in accordance with at least one of the determination result and the comparison result.

4. The vehicle wireless communication system according to claim 1, wherein the portable machine further comprises a second storage configured to store the thresholds, causes the second transmitter to transmit the response signal comprising reception information in which the reception strength of the response request signal received within the predetermined time period is associated with identification information on the first transmitter that is an originator of the response request signal if the portable machine receives the response request signals from at least two of the first transmitters within the predetermined time period or if the portable machine receives the response request signal from only one of the first transmitters within the predetermined time period and the reception strength of the response request signal is less than the threshold, and causes the second transmitter to transmit an inhibiting signal indicative of inhibition of control to the vehicle if the portable machine receives the response request signal from only one of the first transmitters within the predetermined time period and the reception strength of the response request signal is not less than the threshold, and wherein the vehicle control device permits, if the first receiver receives the response signal, control to the vehicle in accordance with the response signal, and inhibits control to the vehicle if the first receiver receives the inhibiting signal.

5. A vehicle control device mounted on a vehicle and configured to control the vehicle in accordance with a wireless signal transmitted and received to and from a portable machine carried by a user, the vehicle control device comprising:

a first transmitter configured to transmit a response request signal to the portable machine comprising a reception region in which signals from a plurality of transmitters are receivable when the portable machine approaches the vehicle;

a first receiver configured to receive a response signal transmitted from the portable machine in reply to the response request signal; and a first controller configured to control the first transmitter and the first receiver;

wherein the first transmitter comprises a plurality of first transmitters to allow the response request signals to reach an area around the vehicle and an interior of a vehicle chamber, and wherein the first controller refers to, after the first receiver receives the response signal transmitted from the portable machine, reception information in which identification information on the first transmitter that is an originator of the response request signal is associated with reception strength of the response request signal received by the portable machine within a predetermined time period, the reception information comprised in the response signal, inhibits control to the vehicle if the portable machine receives the response request signal from only one of the first transmitters within the predetermined time period and the reception strength of the response request signal is not less than a preliminarily set threshold, and permits control to the vehicle if the portable machine receives the response request signals from at least two of the first transmitters within the predetermined time period or if the portable machine receives the response request signal from only one of the first transmitters within the predetermined time period and the reception strength of the response request signal is less than the threshold.

6. The vehicle control device according to claim 5, wherein the first controller receives at the first receiver an inhibiting signal transmitted from the portable machine instead of the response signal if the portable machine receives the response request signal from only one of the first transmitters within the predetermined time period and the reception strength of the response request signal is not less than the threshold, and inhibits control to the vehicle in accordance with the inhibiting signal.

7. The vehicle control device according to claim 5, wherein the threshold is set for each of the first transmitters, and wherein the reception strength of the response request signal transmitted from any of the first transmitters and received by the portable machine within the predetermined time period is compared with the threshold corresponding to the first transmitter.

8. A portable machine configured to transmit and receive a wireless signal for control to a vehicle to and from a vehicle control device comprising a plurality of first transmitters configured to transmit response request signals that reach an area around the vehicle and an interior of a vehicle chamber, the portable machine comprising:

a second receiver configured to receive the response request signal transmitted from the vehicle control device;

a reception strength detector configured to detect reception strength of the response request signal received by the second receiver;

a second transmitter configured to transmit a response signal to the vehicle control device in reply to the response request signal received by the second receiver; and a second controller configured to control the second transmitter and the second receiver;

wherein the second receiver comprises a predetermined reception region in which the response request signals are receivable, wherein in the reception region, when the portable machine approaches one of the first transmitters at a predetermined first distance, the response request signal only from the first transmitter is receivable by the portable machine, and when the portable machine approaches one of the first transmitters at a predetermined second distance shorter than the first distance, the response request signals from the first transmitter and any of the remaining first transmitters are receivable by the portable machine, wherein the second controller causes the reception strength detector to detect reception strength of the response request signal received by the second receiver within a predetermined time period, and causes the second transmitter to transmit to the vehicle control device the response signal comprising reception information in which identification information on the first transmitter that is an originator of the response request signal is associated with the reception strength, wherein the reception information indicating that the second receiver receives the response request signal from only one of the first transmitters within the predetermined time period and the reception strength of the response request signal is not less than a preliminarily set threshold is for inhibition of control to the vehicle by the vehicle control device, and wherein the reception information indicating that the second receiver receives the response request signals from at least two of the first transmitters within the predetermined time period and the reception information indicating that the second receiver receives the response request signal from only one of the first transmitters within the predetermined time period and the reception strength of the response request signal is less than the threshold are for permission of control to the vehicle by the vehicle control device.

9. The portable machine according to claim 8, wherein the second controller causes the second transmitter to transmit an inhibiting signal indicative of inhibition of control to the vehicle instead of the response signal if the second receiver receives the response request signal from only one of the first transmitters within the predetermined time period and the reception strength of the response request signal is not less than the preliminarily set threshold.

10. The portable machine according to claim 8, wherein the threshold is set for each of the first transmitters, and wherein the reception strength of the response request signal transmitted from any of the first transmitters and received by the second receiver within the predetermined time period is compared with the threshold corresponding to the first transmitter.

* * * * *